Jan. 3, 1956

L. G. CHEATUM 2,729,047

PICKUP AND FEEDER MOUNTING FOR HARVESTER

Filed Nov. 1, 1954

INVENTOR.
L. G. CHEATUM

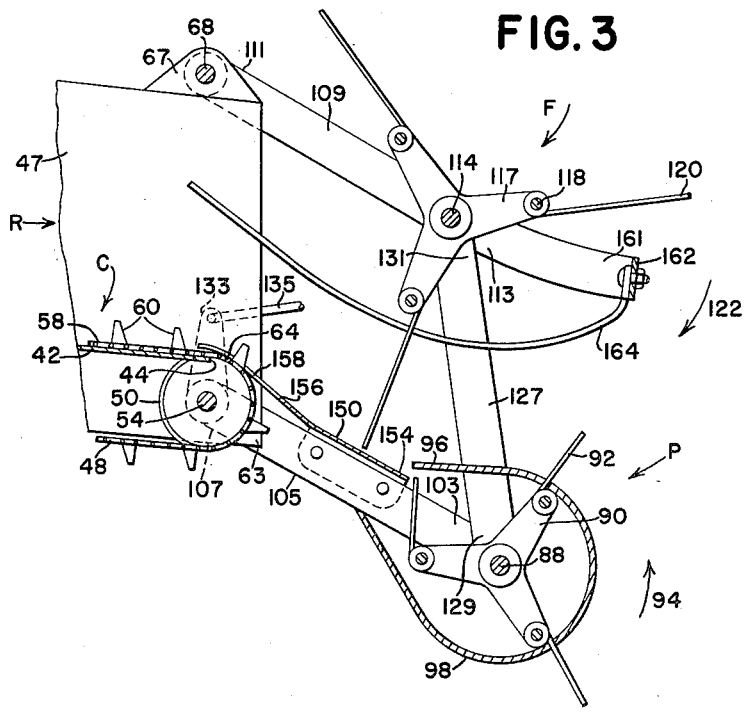
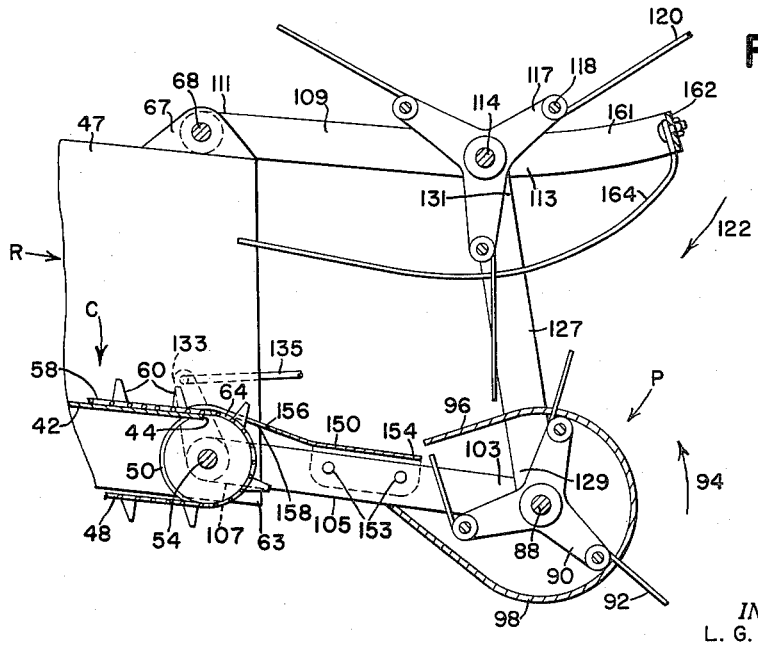

United States Patent Office 2,729,047
Patented Jan. 3, 1956

2,729,047

PICKUP AND FEEDER MOUNTING FOR HARVESTER

Leo G. Cheatum, Ottumwa, Iowa, assignor to Deere Manufacturing Co., Dubuque, Iowa, a corporation of Iowa Application November 1, 1954, Serial No. 466,109

7 Claims. (Cl. 56—344)

This invention relates to a harvester and more particularly to improved means for mounting the pickup and feeder mechanism for such harvester.

The invention comprises essentially an improvement on the structure disclosed in the U. S. patent to Tuft 2,499,615, the nature of the improvement residing primarily in novel linkage supporting the pickup and feeder mechanisms in such manner that the two move independently albeit in controlled arcs relative to the receiving means to which they are instrumental in feeding crops. The vertical relationship between the feeder mechanism and the pickup mechanism is important from the standpoint of insuring a proper delivery of crops regardless of the vertical position of the pickup and feeder mechanisms relative to the ground, which will occur as the pickup mechanism encounters varying ground contour. As shown in the Tuft patent, it is known to mount a pickup mechanism at a normal level ahead of and below the level of a platform or the like to which crops are delivered for ultimate transfer to a crop-treating mechanism such as the bale chamber of a baler. It is also there shown that a feeder is mounted above the pickup means for facilitating the transfer of picked up crops to the receiving means. However, in that case, the feeder mechanism is mounted by articulate linkage and consequently its fore-and-aft position relative to the bale case changes materially in response to vertical movement of the feeder and pickup mechanisms. According to the present invention, this disadvantage is eliminated, because of the connection of the feeder mechanism to the bale case by fore-and-aft links that are longitudinally rigid so that the feeder mechanism must move in an arc having as its center a pivotal connection on the bale case. Moreover, the interconnection between the feeder mechanism and the pickup mechanism is, in the present case, effected by a pair of transversely spaced apart upright links which are articulately connected respectively at opposite ends to the two mechanisms so that greater freedom of movement is permitted. This arrangement allows the use of a smaller pickup mechanism, the advantages of which are low cost, greater operating efficiency in certain conditions and higher speeds of operation.

It is an object of the invention to provide an improved and inexpensive mounting for feeder and pickup mechanisms and one that may be used in existing structures without materially altering the basic design.

The foregoing and other important objects and desirable features inherent in and encompassed by the invention will become apparent as a preferred embodiment of the invention is disclosed in detail in the ensuing specification and accompanying sheets of drawings, the several figures of which will be described immediately below.

Fig. 3 is a fragmentary sectional view, on an enlarged scale, as seen along the line 3—3 of Fig. 2, showing the vertical relationship between the feeder and pickup mechanisms and the crop-receiving means when the pickup mechanism is operating at a relatively low level.

Fig. 4 is a view similar to Fig. 3 but showing the relative positions of the parts when the pickup and feeder mechanisms are at a relatively higher level.

Figures 1, 2:
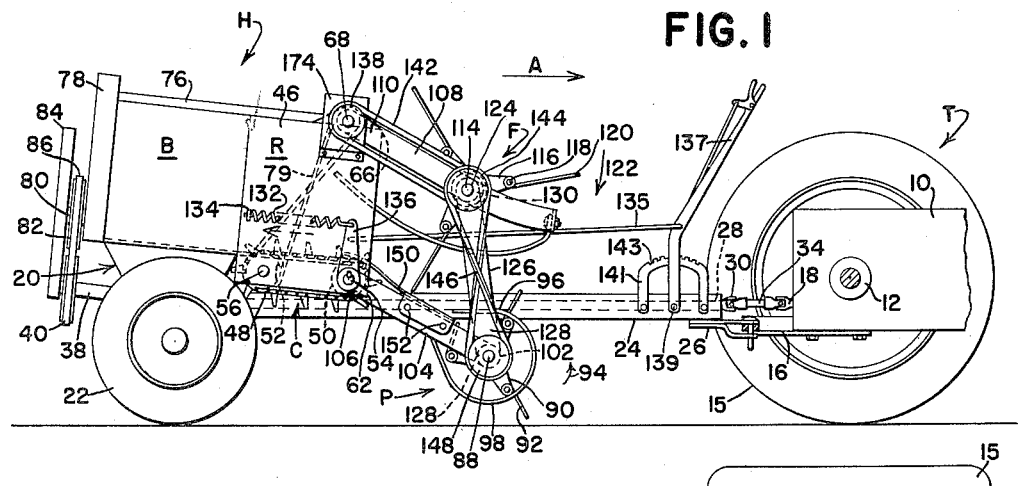
Fig. 1 is a side elevational view showing a tractor-connected harvester, only the rear portion of the tractor being shown and the near wheel of the tractor being omitted.
Fig. 2 is a plan view of the arrangement shown in Fig. 1, the near wheel being present in this view.

For the purposes of illustration, there is shown here a tractor-harvester organization in which the tractor is designated generally by the letter T and the harvester by the letter H. The tractor may be of any suitable construction and hence may have a longitudinal body 10 carried on a transverse rear axle structure 12 including right- and left-hand rear wheels 14 and 15. As is conventional, the tractor body 10 has a rearwardly extending drawbar 16 and a rearwardly extending power take-off shaft 18.

The harvester H includes a mobile main frame 20 carried on right- and left-hand wheels 22 and 23 and supporting crop-treating means, here designated as a bale case B; although, any other suitable means could be used in place of the bale case. The harvester is connected to the tractor in trailing relationship by a combined draft tongue and propeller shaft assembly 24, the clevis for the draft tongue portion being visible at 26 as connected to the tractor drawbar 16, and the propeller shaft portion being visible in dotted lines at 28 and as having front and rear ends respectively including universal joint connections 30 and 32. The connection 30 establishes a power-transmitting connection 34 with the tractor power take-off 18. The connection 32 affords a connection to a main input shaft 36 journaled in any suitable manner below the bale case B, as in an elongated tubular bearing 38, the rearward end portion of which projects behind the bale case, as shown in Figs. 1 and 2. The input shaft 36 has fixed thereto by any appropriate means a drive sheave 40, the purposes of which will appear presently.

In normal use of the tractor-harvester organization, the two travel over the field of crops in the direction of advance as indicated by the arrow A, the harvester being somewhat offset to the right as well as to the rear of the tractor T. The offset enables the harvester to collect crops from the field, whether these crops have been previously harvested and left lying on the field or whether the crops are detached and collected in the same operation. In the present case, the baler has pickup means P for collecting crops that have been previously harvested. These crops are transferred upwardly and rearwardly, assisted by feeder means F, for delivery by a rearwardly moving conveyor C through crop-receiving means R into the bale case B, all of which is generally conventional and requires little, if any, elaboration.

The crop-receiving means R faces forwardly and is here shown as comprising a platform 42 having a transverse front edge portion 44 and right- and left-hand upright sides 46 and 47 spaced apart transversely and defining a relatively large channel through which crops move into the bale case from the pickup means via the conveyor C.

The conveyor C comprises a plurality of transversely spaced apart conveyor elements 48, each in the form of a chain supported by front and rear transversely spaced apart sprockets 50 and 52 carried respectively on front and rear transverse shafts 54 and 56, the upper run of each chain, as at 58, being movable rearwardly over the platform 42. Each chain has a plurality of outwardly projecting crop-engaging members 60 for facilitating the handling of crops.

The front conveyor shaft 54 lies closely adjacent or proximate to the front edge portion 44 of the platform 42 and opposite ends of the shaft 54 are carried in lower front portions 62 and 63, respectively, of the platform sides 46 and 47, these portions 62 and 63 comprising transversely spaced apart support elements on the platform. The front portion of each chain 48 that passes about its respective sprocket is also closely adjacent to the front edge portion 44 of the platform 42, which portion of each chain is designated generally by the numeral 64.

The sides 46 and 47 of the platform respectively have upper front portions which serve as transversely spaced apart support elements or bearings 66 and 67 for journaling opposite ends of a rear upper cross shaft 68, the left-hand end of which, as at 69, has fixed thereto in any suitable manner a sheave 71 which is in fore-and-aft alinement with but at a level above a sheave 73 fixed to a left-hand extension 75 of the rear conveyor shaft 56. A crossed belt 79 is representative of means for establishing a driving connection between the shaft 68 and the shaft 56.

The right-hand end portion of the shaft 68, as at 72, projects beyond the upper support element 66 and enters a gear box 174 in which is drive gearing (not shown) driven by a fore-and-aft extending drive shaft 76 that derives its power from a rearwardly mounted gear box 78 behind the bale case B and at the right-hand rear corner of the machine. Drive gearing (not shown) contained within the gear box 78 is driven from a shaft 80 to which are fixed a sheave 82 and a flywheel 84. The sheave 82 is driven by a belt 86 from the previously described input sheave 40. The details of the driving mechanism, although not important here, are similar to those disclosed in the U. S. patent to McClellan 2,612,099. As illustrated here, the drive is only representative of many that could be used.

The pickup P, which is disposed ahead of the crop-receiving means R, as is conventional, may be of the type shown in the U. S. patent to Hill 2,347,907. In any event, the details are relatively unimportant here. Suffice it to say that the pickup means includes a transverse shaft 88 having axially spaced therealong a plurality of pickup spiders 90, each spider carrying a plurality of crop-engaging elements or pickup fingers 92 which are operative, as the pickup means rotates in the direction of the arrow 94, to pick up crops from the ground and to deliver or transfer them upwardly to a pickup top portion 96 made up by a plurality of transversely spaced apart strap members 98 that are wrapped around the pickup means and interspaced with the fingers 92.

The pickup shaft 88 has right- and left-hand ends 100 and 101, respectively, which serve as transversely spaced apart and alined connecting elements for establishing a pivotal connection on a transverse horizontal axis with right- and left-hand front end portions 102 and 103 respectively of right- and left-hand lower links 104 and 105, respectively. The links 104 and 105 respectively have rear ends 106 and 107 pivotally connected on a transverse horizontal axis to the crop-receiving means R via the shaft 54 and the supporting elements at the lower front corners 62 and 63 of the platform sides 46 and 47. The axis just described may be referred to as a first transverse pivot axis and the axis of the connections of the front ends of the links 104 and 105 to the pickup means P may be referred to as a second horizontal transverse axis. The links 104 and 105 thus carry the pickup means P for vertical movement relative to the main frame 20 and the crop-receiving means R which, as stated, is rigid with the main frame. Vertical movement of the pickup means relative to the main frame and crop-receiving means is controlled by the links 104 and 105 which, being rigid in length, confine movement of the pickup means to arcuate movement about the first horizontal axis (through the shaft 54) as its center.

The feeder mechanism F is carried above the pickup means P and is supported in that position by right- and left-hand upper links 108 and 109. These links are of rigid construction and are spaced apart transversely and extend fore and aft, respectively having rear ends 110 and 111 and front ends 112 and 113. The rear ends 110 and 111, respectively, of the links 108 and 109 are connected on a third transverse pivot axis to the crop-receiving means R via the opposite end portions 72 and 69 of the cross shaft 68, being thus supported at the upper supporting elements established at the upper front corners 66 and 67 of the platform sides 46 and 47.

The front ends 112 and 113, respectively, of the upper links 108 and 109 carry a transverse feeder shaft 114 on which are mounted in coaxially spaced relation right- and left-hand end members 116 and 117. Between these members 116 and 117 are supported several feeder-finger-supporting shafts 118, each of which has mounted thereon feeder elements or fingers 120, as is generally conventional, one example of which appears in the above-mentioned Tuft patent. The arrangement and mounting of the feeder is such that it rotates in the direction of the arrow 122 so that the tips of the fingers 120 move rearwardly over the top portion 96 of the pickup means P. The respective pivotal connections between the front ends of the upper links 108 and 109 with the feeder shaft 114 are afforded by right- and left-hand end portions 124 and 125 on the feeder shaft. The links 108 and 109 control vertical movement of the feeder F so that such movement is confined to an arc about the third pivot axis established by the cross shaft 68.

In order that the vertically spaced relationship between the pickup P and feeder F may be maintained, the two are articulately interconnected by right- and left-hand transversely spaced apart upright links 126 and 127, the lower end of the link 126, as at 128, being connected to the pickup means P and to the front end of the lower link 104 via the pickup shaft right-hand end 100 and the upper end of the link 126, as at 130, being pivotally connected to the feeder F and to the front end of the upper link 108 by the right-hand end 124 of the feeder shaft 114. The left-hand link 127 has lower and upper ends 129 and 131 respectively connected to the left-hand end portions 101 and 125 of the pickup and feeder shafts.

The supporting linkage made up of the links 104—105, 108—109 and 126—127 constitutes parallel linkages vertically movably mounted on the crop-receiving means R and capable of carrying the pickup and feeder means P and F for vertical movement relative to the crop-receiving means as the pickup means encounters varying ground contour. Moreover, the pickup and feeder means may be adjusted vertically during transport of the machine, which adjustment may be accomplished by connecting to the rear end 107 of the left-hand lower link 105 an upstanding arm 133 to which is connected a forwardly extending pull rod 135, the forward end of which is connected to a hand lever 137 that has its lower end pivotally mounted at 139 on a forward portion of the tongue and propeller shaft assembly 24. A sector 141 has therein a notch 143 with which detent means (not shown), conventionally provided on the lever 137, is cooperative when the lever is rocked in a counter-clockwise direction to raise the pickup and feeder means P and F for transport purposes. If the lever 137 is left unlocked, the pickup and feeder means may have a floating action, which action is counterbalanced by means of a tension spring 132 connected between a fixed point 134 on the right-hand side 46 of the crop-receiving means R and the upper end of a right-hand ram 136 fixed to the right-hand link 104.

Representative drive means from the upper rear cross shaft 68 to the feeder means F includes a sheave 138 keyed to the right-hand extension or end 72 of the shaft 62 and in fore-and-aft alinement with a sheave 140 that is fixed to the right-hand end 124 of the feeder shaft 114. A belt 142 is trained about the two sheaves. A second sheave 144 is fixed to the right-hand end 124 of the feeder shaft 114 and carries the upper loop of a crossed belt 146, the lower loop of which is trained about a sheave 148 keyed to the right-hand end 100 of the pickup shaft 88, the latter means constituting representative drive means between the feeder and pickup shafts 114 and 88. These drive means derive their power in the first instance from the power take-off of the tractor via the shafting and associated mechanism previously described.

Because the pickup means P is spaced ahead of the front edge portion of the platform 42, there is provided a deck sheet 150 for transferring crops from the pickup top portion 96 to the front part of the conveyor C. This deck sheet is connected at its right- and left-hand sides respectively at 152 and 153 to the lower links 104 and 105 and has a front portion 154 rearwardly adjacent and in crop-receiving relationship to the top portion 96 of the pickup means P. The deck sheet further has a rearward portion 156 proximate to the front portion of the conveyor C. Specifically, the rear portion 156 of the deck sheet has a plurality of transversely spaced, fore-and-aft extending slots 158 for respectively accommodating the lugs 60 on the chains 48, since the rear part 158 of the deck sheet overlaps the front portions 64 of the chains.

The upper links 108 and 109 respectively have rigid therewith, preferably integral, forward extensions 160 and 161, which extensions are transversely alined and cross-connected by a support or bar 162 to which are rigidly affixed a plurality of fore-and-aft extending, transversely spaced apart strippers 164. These strippers are interspaced with the feeder fingers 120 and extend rearwardly below the feeder F, above the pickup P and over the deck sheet 150.

In normal operation, the harvester H is drawn by the tractor T for advance over a field of crops, the pickup means P operating adjacent to the ground to pick up crops and to transfer them upwardly to the pickup top portion 96, whence the crops are swept rearwardly by the feeder F onto the deck sheet 150 and the crops are thence picked up by the chains 48 and transferred rearwardly into the bale case B. As varying ground contour is encountered, the pickup means P, together with the feeder F, can rise and fall relative to the bale case and crop-receiving means. The advantageous employment of the relatively small diameter pickup means P means that the pickup means top portion 96 will be at a level somewhat below that of the conveyor C, but this difference in height is accommodated by the upwardly and rearwardly inclined deck sheet 150. Since the deck sheet is carried exclusively by the lower links 104 and 105, it does not interfere with either the crop-receiving means or the upright links 125 and 127, thus being free from interference with articulation of the parallel linkage thus afforded. Loss of crops is prevented by the relationship between the portions 96 and 154 and the slotted accommodation of the chain lugs 60 by the slotted rear portion 158 of the deck sheet 150.

Various other features of the invention not specifically enumerated herein will undoubtedly occur to those versed in the art, as will various modifications and alterations in the preferred embodiment of the invention disclosed, all of which may be achieved without departing from the spirit and scope of the invention.

What is claimed is:

1. In a harvester having a mobile frame adapted to advance over a field of crops, the improvement comprising: a crop-receiving platform rigid on and projecting in a forward direction from the main frame and having a transverse front edge portion and a pair of upright sides, said sides respectively having upper front portions spaced transversely apart and spaced above the front edge portion; a transverse conveyor shaft carried by the platform parallel and adjacent to the platform front edge portion and having opposite ends projecting transversely respectively beyond the platform sides; an endless conveyor movable rearwardly over the platform and between the platform sides and including a forward shaft embracing portion at the platform front edge portion; pickup means transverse to the line of advance and spaced ahead of the platform, said means including a top portion at a normal level below that of the platform and movable pickup elements operative to pick up crops from the ground and to transfer such crops to said top portion, said means further including coaxial shaft portions projecting transversely respectively at opposite ends thereof; supporting linkage mounting the pickup means on the platform for vertical movement, said linkage including a pair of transversely spaced apart fore-and-aft lower links having rear ends pivotally connected to the platform on a transverse axis respectively via the aforesaid conveyor shaft ends and pivotally connected at their front ends to the pickup means on a transverse axis respectively via the pickup means shaft portions, a pair of transversely spaced apart fore-and-aft upper links pivotally connected respectively at their rear ends directly to the upper front portions of the platform sides for vertical movement about a transverse axis and extending forwardly to front ends spaced above the pickup means, a transverse feeder shaft having opposite ends carried respectively by the front ends of the upper links, and a pair of transversely spaced apart upright links pivotally connected at their lower ends respectively to the pickup means shaft portions and pivotally connected at their upper ends respectively to the ends of the feeder shaft; a fore-and-aft deck sheet cross-connecting the lower links and having a front part rearwardly adjacent to the pickup means top portion and having a rear portion closely overlying the aforesaid shaft-embracing portion of the platform conveyor; and a feeder carried by the feeder shaft and including crop-engaging elements movable rearwardly over the pickup means top portion and rearwardly over the front part of the deck sheet.

2. The invention defined in claim 1, in which: the platform conveyor comprises a plurality of transversely spaced apart fore-and-aft extending members, each having a shaft-embracing portion as aforesaid and each having outwardly projecting crop-engaging elements; and the rear portion of the deck sheet is provided with a plurality of transversely spaced apart fore-and-aft extending slots respectively accommodating the crop-engaging elements of the conveyor.

3. The invention defined in claim 1, in which: each upper link has rigid thereon a forward extension projecting ahead of the feeder, said extensions are transversely alined and rigidly cross-connected by a transverse support; the feeder elements are transversely spaced apart; and the support carries a plurality of rearwardly extending strippers directed beneath the feeder and above the deck sheet and interspaced with the feeder elements.

4. The invention defined in claim 1, in which: a transverse drive shaft extends across and is carried by the upper front portions of the platform sides and serves to mount the rear ends of the upper links, first drive means interconnects the drive shaft and the feeder shaft; and second drive means interconnects the feeder shaft and one of the pickup means shaft portions.

5. In a harvester having a mobile frame adapted to advance over a field of crops and including rigid therewith a forwardly facing crop-receiving means, the improvement comprising: a pair of lower support elements rigid with the crop-receiving means and transversely spaced apart and alined; a pair of transversely spaced apart and alined upper support elements rigid with the crop-receiving means and spaced respectively above the lower support elements; pickup means transverse to the line of advance and positioned ahead of the crop-receiving means and including transversely spaced apart and alined connecting elements respectively ahead of the aforesaid lower support elements; transverse feeder means above the pickup means and ahead of the crop-receiving means and having transversely spaced apart and alined connecting elements respectively above the pickup means connecting elements and respectively ahead of the aforesaid upper support elements; a pair of rigid, transversely spaced apart, fore-and-aft extending lower links having rear ends connected respectively to the lower support elements on a first transverse pivot axis and having front ends connected respectively to the pickup means connecting elements on a second transverse pivot axis; a pair of rigid, transversely spaced apart, fore-and-aft extending upper links having rear ends connected respectively directly to the upper support elements on a third transverse pivot axis and having front ends connected respectively to the feeder means connecting elements on a fourth transverse pivot axis; and a pair of rigid transversely spaced apart, upright links connected respectively at their upper and lower ends to the feeder means connecting elements on said fourth pivot axis and to the pickup means connecting elements on said second pivot axis.

6. The invention defined in claim 5, in which: each upper link has rigid thereon at its front end a forward extension projecting ahead of the feeder, said extensions are transversely alined and cross-connected by a rigid support; and stripper means is secured to the support and extends rearwardly below the feeder means and above the pickup means.

7. The invention defined in claim 5, in which: a deck sheet is carried exclusively by the lower links and extends rearwardly from the pickup means to the crop-receiving means.

No references cited.